United States Patent [19]

Levine

[11] Patent Number: 4,915,435
[45] Date of Patent: Apr. 10, 1990

[54] MOBILE OPERATING ROOM WITH PRE AND POST-OPERATIONAL AREAS

[76] Inventor: Brian M. Levine, 28571 Springfield Dr., Laguna Niguel, Calif. 92677

[21] Appl. No.: 333,634

[22] Filed: Apr. 5, 1989

[51] Int. Cl.⁴ ............................................... B60P 3/14
[52] U.S. Cl. ..................................... 296/74.1; 29/428
[58] Field of Search .................. 296/26, 24.1, 19, 1.1; 280/6.1; 29/428

[56] References Cited

U.S. PATENT DOCUMENTS

| | | | |
|---|---|---|---|
| 4,449,746 | 5/1984 | Clark | 296/1.1 |
| 4,570,733 | 2/1986 | Star | 280/6.1 |
| 4,712,822 | 12/1987 | Janos et al. | 296/24.1 |
| 4,743,059 | 5/1988 | Legneu | 296/24.1 |

*Primary Examiner*—Robert R. Song
*Attorney, Agent, or Firm*—Jackson & Jones

[57] ABSTRACT

A mobile operating room is a transportable unit in which invasive surgical procedures can be performed. The mobile vehicle is a self contained, expandable van that includes all of the operating requirements called for in fixed hospital facilities. A mobile trailer which, when set up on leveling jacks and expanded, includes an operating room, surgery table, operating lights and all of the essential facilities for complete invasive surgical procedures including pre and postop areas.

The surgical operating room itself (OR) contains a sterilizing autoclave for surgical instruments, a surgeon controllable automatic operating table, OR table, OR spotlights, anesthesia machine, and all essential surgical equipment necessary for comprehensive patient care.

35 Claims, 2 Drawing Sheets

MOBILE OPERATING ROOM WITH PRE AND POST-OPERATIONAL AREAS

BACKGROUND OF THE INVENTION

1. Field of the Invention

This invention relates to non-fixed hospital and patient care centers and more particularly relates to a mobile operating room that is fully equipped for invasive surgery.

2. Description of the Prior Art

At present, surgery is performed in permanent and fixed locations such as hospitals, surgical centers, physicians offices or so-called "surgicenters". Such hospitals and surgical centers are subject to state building codes and must meet stated requirements for their certification as hospitals qualified for invasive surgery. The primary requirements for qualification include an operating room, central nursing station, pre and post-operational (preop and postop) areas, clean-up and closet area, lavatory, clean and soiled linen areas, surgical scrub sinks, a clock and a sterilizing area for surgical instruments. Until the advent of this invention these requirements were not met in a mobile invasive surgery room.

Currently, there are mobile units that provide diagnostic medical care. These are ambulance or van type units that provide non-invasive services such as Magnetic Resonance Imaging (MRI), cardiac catherization (cath labs), or the like. These units are simply medical facilities on wheels. There are also mobile medical units that provide therapeutic services such as shock wave lithotripsy (stone fragmentation) for both kidney and bladder stones. None of these units can provide or meet the invasive surgery requirements.

The concept of mobilized medial care involving invasive surgery is not a new one. Mobilized medical care was provided by the military during the last three wars in which this country have been involved. However, the concept of mobilization in the armed services relates only to the ability of personnel to transport containerized surgery equipment to a remote location and through that designated and containerized approach quickly establish hospitals in needed combat areas. For example, transportation of the modular components of the hospital, once containerized, are accomplished by using helicopters and transport planes. These modular units are simply sealed in canister-like containers that are pre-wired and require actual set-up with other shipped surgical equipment from other containers that are also transported to the site by plane. In most of these units the preop and postop facilities are provided by tents that are set up in the area adjoining the surgery canisters once they have been set up and supplied with needed surgical equipment.

The military hospital modular units figure prominently in this country's National Disaster Preparedness System. The supportive units, however, may take days to establish if supplementation of the private hospital facilities are requested. In summary, the operating room module in the military service is simply a non-moving, isolated unit that is pre-wired for electricity and telephone but has no other autonomous or self-contained features as those that are provided by the mobile operating room of this invention.

The last few decades have brought forth new and exciting developments in medical technology. The mobile operating room of this invention offers an extension of a hospital's surgical capability while providing, for the patient, reduced costs as well as convenience of care.

SUMMARY OF THE INVENTION

The mobile operating room is a unique transportable unit in which invasive surgical procedures can be performed. To date, in the inventor's knowledge, surgery has never been performed in a mobile facility. The mobile vehicle of this invention is a self contained, expandable van that includes all of the operating requirements called for in fixed hospital facilities and provides a mobile trailer which, when set up on leveling jacks and expanded, includes an operating room, surgery table, operating lights and all of the essential facilities for complete invasive surgical procedures including pre and postop areas in the single van for patients. As such, the mobile operating room contains equipment and accomodations heretofore found only in fixed surgical facilities.

For example, the mobile operating room of this invention includes a sterile operating room (OR), an OR table, OR spotlights, anesthesia machine, comprehensive patient monitoring system, nursing surveillance station, preop area, recovery area, autoclave, dressing facility, as well as a complete set of surgical instruments. The foregoing are all self-contained in place in the vehicle and with very little set-up time and effort are immediately operable for invasive surgery. No other mobile van contains the above-mentioned features.

The proposed mobile operating room, being an autonomous and complete, compact surgical facility on wheels, may be quickly moved from location to location and may be set up in very short time. The expandable portion defines the operating room. A surgeon's operating table is centrally located in the trailer and that table may be automatically controlled in any well known manner for standard surgical tables. After use and when the van is to be moved that surgical table may be swiveled to a stowage position and the sides of the van nest together around that table. Thus in one embodiment the table remains in place and operative without being moved or otherwise disrupted. In a similar manner the surgical spotlights also may be folded into a stowage position without disconnection and these lights will also remain in place in the center of the operating room.

In another embodiment the surgical table may be mobilized within the van for stowage. Such tables have retractable wheels that are used to stabilize the table during operations. Once the van has been moved and the expandable sides telescoped out to their expanded position, the operating room is quickly readied for surgery and patient pre and postop care.

The mobile surgical room of this invention may be utilized almost immediately where requested and thus offers significant advantages for military preparedness and lower operating costs and greater flexibility than fixed base hospitals. Although not proven by research or tests, the compactness and close proximity of all necessary surgical needs may well provide a close and comfortable security to patients that large sterile hospitals do not offer. In any event, the mobile surgical room is compact, autonomous, self contained, fully staffed and provides complete security for the all the patient's surgical needs.

DESCRIPTION OF THE PREFERRED EMBODIMENT

Figure 1:
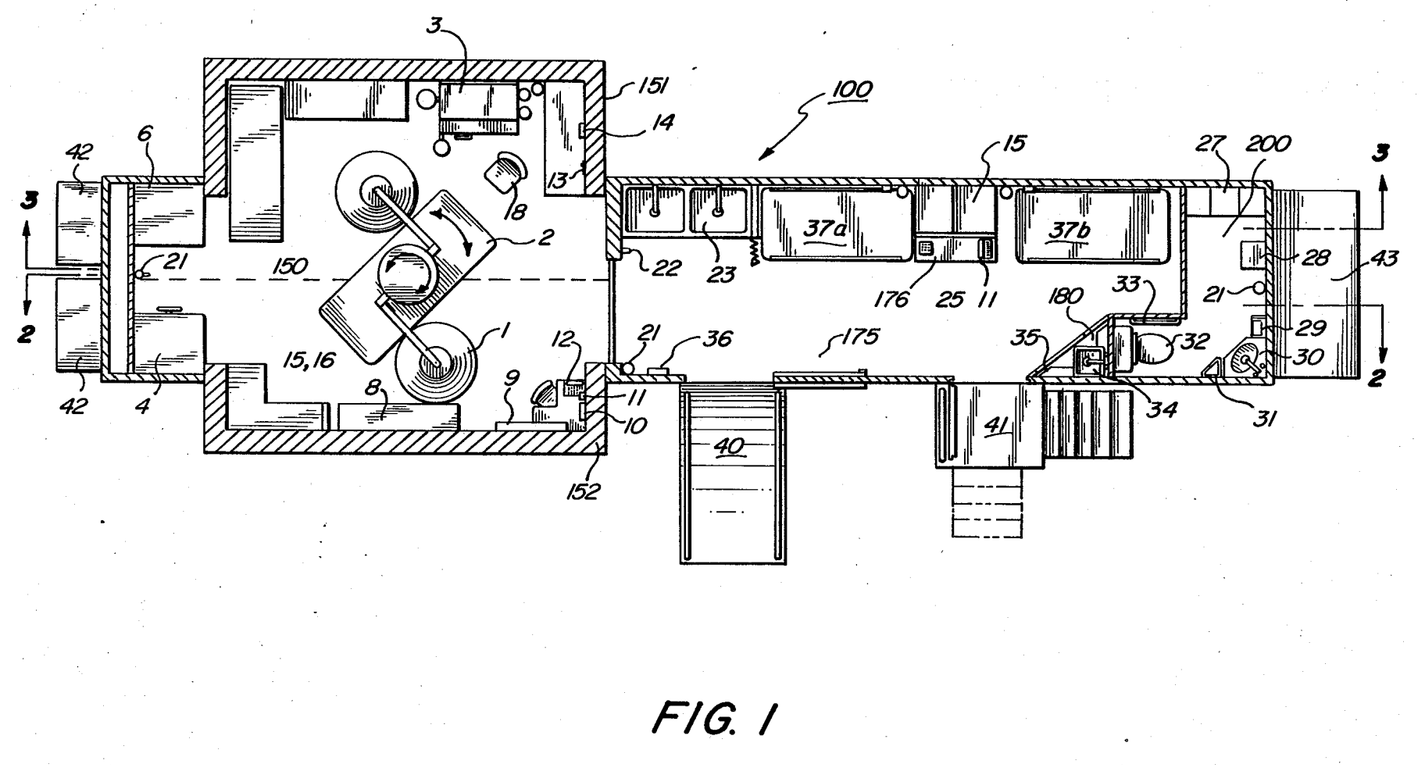
FIG. 1 is a top plan view of a cut-away portion of the mobile operating room of this invention.

The van 100 of FIG. 1 includes several distinct areas including a surgery area 150, a preop and postop area 175, a toilet and dressing area 200 and a cleanup area 180. In the primary surgery area 150, the Figure shows the van with its expanded sides 151 and 152 telescoped out and extending outwardly away from the standard van dimensions that permit the van to travel on the road and highways.

In the center of room 150 is located the surgical spotlights 1 and the surgical table 2. Table 2 is a typical operating table as is found in hospitals and includes tilting, raising and lowering mechanisms, surgical sides and various other surgical features that are well known and require no further description. Table 2 and the spotlights 1 may both be turned and collapsed into a central position so that the van sides 151 and 152 may be nested into van 100 for mobility needed for movement to a new location.

These two primary items, spotlights 2 and table 1, for invasive surgery in this mobile operating invention remain connected and fixed in position while the sides 151 and 152 nest about them. This feature is a significant advantage over any known prior art and represents a major breakthrough in invasive surgery methods and apparatus. The jacks 155 are used to fully support and stabilize the mobile operating room 100 once it has been moved to a new position.

Figure 2:
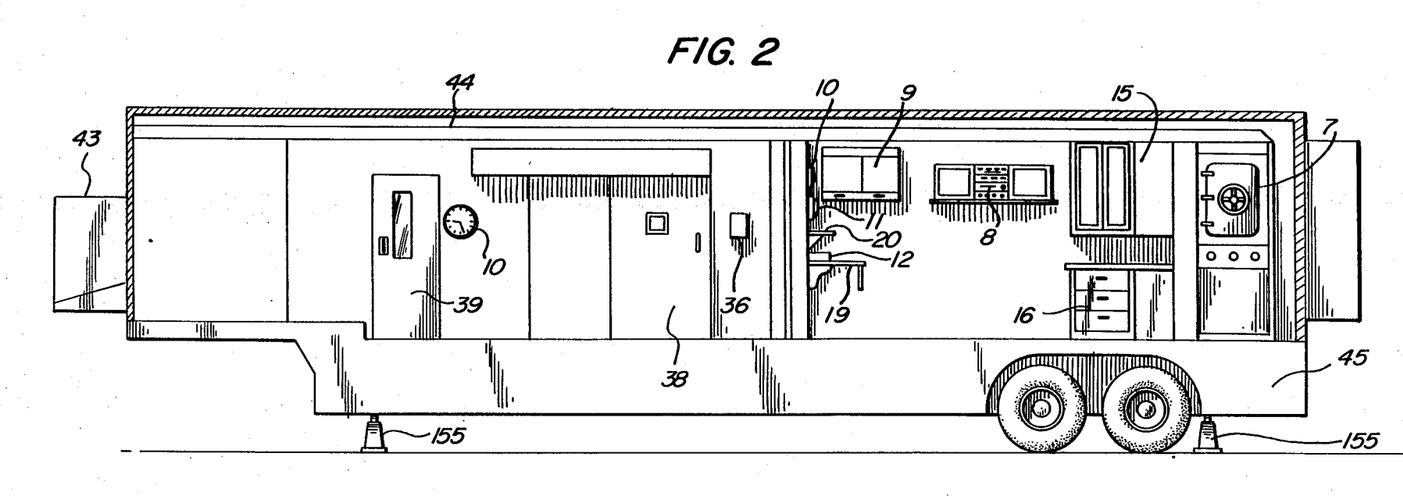
FIG. 2 is a cut-away side view taken along the lines 2—2 of FIG. 1.
Figure 3:
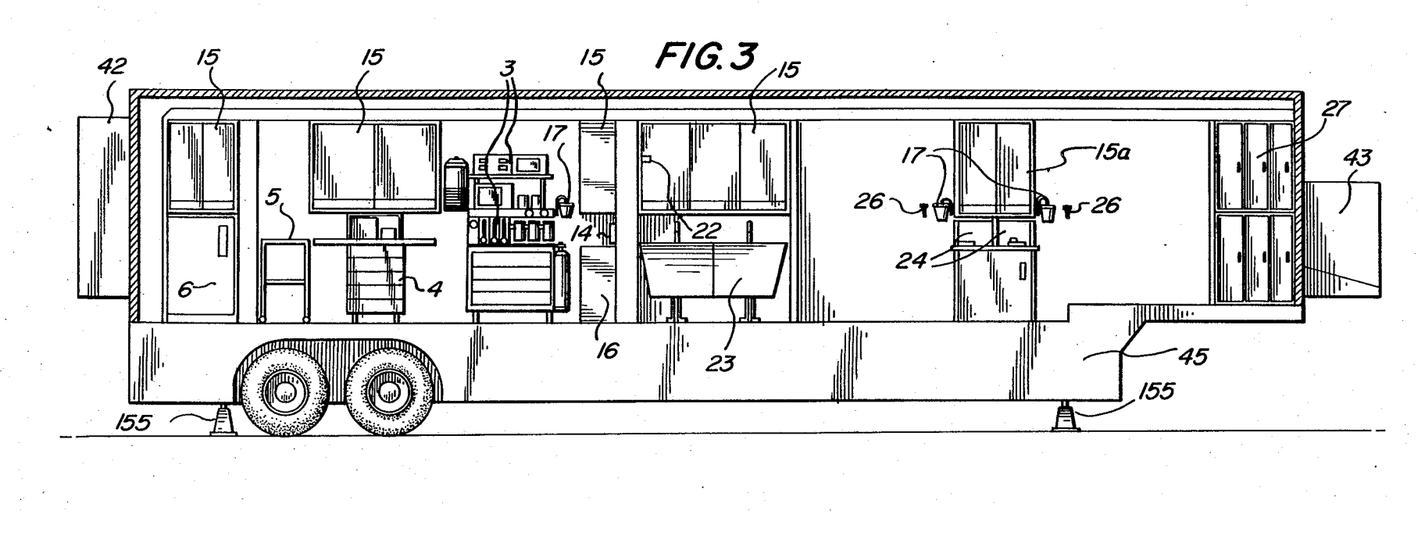
FIG. 3 is another cut-away side view taken along the lines 3—3 of FIG. 1.

Located within the surgery room 150 are all the primary and essential surgical equipment and supplies as mandatory for safe and well conducted invasive surgery. Before describing the functions of essential equipment for the surgery van 100, it is believed helpful to identify the contents of the van by the following list which includes the numbers identified on the drawings. Apparatus that is common to several locations all bear the same numbers. See for example the clock 10 (in the area 175) as shown in plan view in FIG. 2 and also a separate clock 10 as shown in top view in area 150, FIG. 2. Other common items are telephone instruments 1,1, cabinets 15, etc.

Wall suction units 17 are also common to several areas and it should be understood that these units all share a common suction supply source that is located, for example in the storage area 45 under the van. The provision of a suction supply source and line is in accordance with any well known technique and need not be further explained herein. A complete list of essential items include the following:

1. Surgical Spotlights
2. Operating Room Table
3. Anesthesia Machine with Monitors
4. Crash Resuscitation Cart
5. Rolling Surgical Instrument Table
6. Blanket and Fluid Warmer
7. Autoclave
8. VCR Monitor
9. X-Ray Viewbox
10. Clock
11. Telephone
12. Dictation Machine
13. Emergency Switch
14. Intercom
15. Storage Cabinets
16. Storage Drawers
17. Wall Suction
18. Chair
19. Work Desk
20. Work Shelf
21. Fire Extinguisher
22. Emergency Light
23. Scrub Sinks
24. Monitor
25. Refrigeration
26. Wall Oxygen Source
27. Lockers
28. Clean Linen Shelf
29. Trash Basket
30. Sink
31. Dirty Linen Basket
32. Toilet
33. Handrail
34. Service Sink
35. Workroom Shelf
36. Patient Lift Controls
37. Gurney
38. Patient Entry Sliding Doors
39. Personnel and Patient Door
40. Patient Lift
41. Self Supporting Slide Out Platform with Steps
42. Air Conditioning Unit
43. Generator
44. Ventilation Ducts
45. Underbody Compartments The construction of the mobile surgical room 100 will follow closely the guidelines issued by the State of California Office of Statewide Health Planning and Development (OSHPOD) "surgical and anesthesia service space" outlined clearly in Section 2-1016A Title 24 of the California State Building Code. As such, the mobile surgical suite will have the following features: (1) Operating Room 150, (2) Preoperative patient preparation and holding area 175 employing gurney 37a, (3) Post anesthesia recovery area employing gurney 37b, (4) Central nursing supervision area 176 located between gurneys 37a and 37b, (5) Dressing facility 200 with lockers 27 and lavatory 32, (6) Storage space 15, 16 in area 150 for sterile instruments and supplies, (7) Two surgical scrub sinks 23 in area 175, (8) Separate locations for clean (28) and soiled linen (31) in area 200, (9) Janitorial closet 180 with utility sink 34, (10) Autoclave 7, (11) Refrigerator 25, (12) Lockable medicine cabinets 15, (13) Air Conditioner 42, (14) Oxygen 26 and suction outlets 17 at patient locations, (15) Clocks, (16) Hydraulic entrance lift for patients in wheelchairs or transported on gurneys.

The operating room is supplied with the most modern, state of the art equipment. For example, the anesthesia machine 3 provided will be safe and reliable. Patient monitoring in the operating room as well as in pre and post-op areas will be as technically sophisticated as one would find in any hospital. In addition, many safety features are installed in the mobile surgical suite. Smoke detectors and fire extinguishers are generously placed for safety purposes. Also, an isolation transformer detection system is installed to identify any electrical leakage that may pose a risk to patients or personnel.

An efficient system of ventilation and anesthetic gas disposal is located in the van's construction. In the case of a patient catastrophe, a "code blue" alarm system is established and a resuscitation cart 4 with defibrillator, drugs, and equipment is readily accessible in location 150. Finally, a back up generator will be attached to the mobile surgical suite in the case of sudden and unexpected power failure.

To ensure the highest quality of medical care, well trained personnel are providable in designated areas of van 100. In addition to the presence of competent surgeons in area 150, an anesthesiologist as well as surgical technician instruments will be present during operations to assist surgeons. There is ample room for two registered nurses who will provide patient care and may circulate as needed in the operating room 150 as well as in the pre and post-op areas 175. A driver/technician assists in transportation of the mobile surgical suite as well as providing assistance to the nurses for patient transport.

In order to fully support the invention's capabilities the typical dimensions and construction features for the mobile surgical suite are supplied below.

Product Dimensions

Exterior -
   Length 46'
   Width 8'
   Height 13'6"
Interior
   Length 44'
   Width 7'0" (Expanded Sides Extended to 13'8")
   Height 9'3 ¼" (Except in 5th Wheel Area Approximate Height is 8'2 ¼")

Trailer Construction

Trailer is a semi-trailer type, special frame built with double expanding sides. Wheels 24.5"×8.25 steel rims and tubeless tires. Hydraulic leveling system, utilizing a manually set stabilizer bar. Crossmembers are Steel "C" type on 24" centers. Brakes 16½"×7". Fifth wheel coupler 2 bag system, 32,000 lb. capacity with 20¼" king pin location. Lubrication system, industrial grade lubrication fittings are accessibly located on equipment.

Body Structure

Panels:
   Side 0.050 Aluminum
   Front 0.050 Aluminum
   Corner 11 Gauge Steel
Posts:
   Side 14 Gauge Steel
   Front 11 Gauge Steel
Roof:
   Sheet 0.049 Aluminum
   Bows 0.125 Aluminum
Lower Body Rail: 11 Gauge Steel
Roof Rail: Extrusion aluminum All doors are framed with steel as required. Tapping plates are installed to secure equipment in place and are readily available and in place during trailer construction for pre-tapped use during van set-up. The trailer has dual expandable sides: 16 feet long by 2 feet 9 inches wide on curbside and 16 feet long by 4½ feet wide on roadside. This is a single integral unit with exception of the floor which is hinged to the expanding sides. Each expanding side is motor driven with a safety key lock. A mechanical crank mechanism is also provided to open and close the expanding sides in case of emergency.

Insulation

Trailer body is insulated in sides, ends, floor and ceiling using two (2) part urethane foam. (R Factor=7.14"). A 2 and ¼" masonite thermal barrier is provided on vertical members prior to installation of the van's finished walls.

Interior Walls and Ceiling

Walls throughout van are covered with laminate on lower portion and industrial grade wall covering on the upper half At the split between laminate and wall covering a wood chair rail is installed. All interior surfaces are rated Class A. Ceiling is drop-type acoustical panels. Ceiling tiles are secured in transit yet removable.

Floor

The floor is vinyl tile throughout the trailer. The expanding sides have hinged floor panels with a vinyl tile covering. The floor tile is rated Class I.

Painting

Body exterior is cleaned, sanded and primed for urethane enamel. Foam and underside of floor are undercoated.

Entrance Doors

Doors are steel construction. Doors are insulated and sealed when closed. The personnel door includes a tinted safety glass window. The personnel door is equipped with heavy duty butt hinges. All belly compartment doors operate with a single key.

Platforms and Stairways

Pull out platforms with light-weight portable stairs equipped with adjustable leveling feet are provided. Removable safety rails are provided for platforms and stairs.

Electrical System

Standard electrical system requires 480V, 3 Phase, 150 AMP power (or as required by catherization system) and wiring is run in aluminum flex conduits of sufficient size to allow wires to be added for upgrades if needed. Power distribution is located inside the trailer and a power panel includes all circuit breakers, meters, phase sequence indicator, and a shore power/generator transfer switch. A compartment located in the belly pan 45 contains the utility stepdown transformer, battery and battery charger.

Lighting

Fluorescent lighting is provided throughout the trailer. The operation area and patient care areas have light fixtures mounted in the ceiling that are dimmable. 12 volt DC emergency lighting is provided throughout the interior and in exit signs appropriately mounted in the van 100. A wall switch is provided to turn off emergency lighting during extended periods when power is not being provided. 12 volt compartment lights are provided in all exterior compartments.

Generator

Any suitable 250KW, 480V, 3 Phase, 4 wire air coiled generator is provided—such diesel generators are well known. The generator is equipped with remote controls, starting batteries and oil bath air cleaner. Generator is installed for easy servicing, proper heat and exhaust dissipation. A remote alarm annunciator panel, AC instrument package and critical area silencer are also provided. (Generator sized to operate catheterization system may also be an optional feature.) Within the belly compartment 45, or exterior in the front, such generator is installed together with a 100 gallon fuel tank with an electromechanical gauge. The fuel tank is equipped will fill and drain nozzles with a provision for locks. The drain nozzle is positioned so that the tank can be completely drained. An accessory backup generator may be provided.

Air Condition/Heating

Two (2) air conditioners 42 are mounted on the rear of the trailer. The system shall operate on 480 volt, 3 Phase, 60 Hz power and provide: Cooling Capacity: 92,000 BTU/HR and Heating Capacity: 102,000 BTU/HR. The conditioned air is circulated to the interior spaces through metal supply and return ducts installed between roof and ceiling. The supply duct is insulated as is well known. An adjustable air diffuser system distributes the optimum conditioned air quantity to each specific area in the van. Condensate is dispensed to ground via drain tubing. Four (4) stages of thermostatically controlled electric heaters within the air handling unit maintain htte interior van temperature at 72° F.+/−5° F.

Plumbing

The plumbing system is designed to receive water directly from local sources to fill tanks. The fresh water and waste water storage containers, of any suitable type, are installed within the underbody compartment 45 and are accessible through a hinged door. Such compartments are provided with electric heaters for winter protection against freezing. Fresh water hoses are connected to a water faucet at sink by high pressure, polybuthylene tubing, pumps, etc. as is well known. Access to sink piping and traps plus all isolation valves are designed into the van's plumbing system. Plumbing system is equipped with check valves in accordance with approved commercial practice and need not be explained in any more detail.

Interior Furnishing

Stainless steel sinks with cold water faucet lavatory hardware is provided.

Safety Features

All Treatment Room walls are lead lined including expanding side walls 1151, 152 to required specifications.

Cabinet Construction

Cabinetry and like items such as items 15,16,18,19,27,33,35, are constructed of plywood, laminated with micarta or any other suitable material.

Surgical suite provisions at this point it is believed helpful to list some commonly available and acceptable commercial items that are needed in the furnishing of the surgical suite for this invention. The model and type equipment listed hereinafter in the parenthesis are typical off the shelf items supplied by the manufactures whose names are given. The matter in parenthesis include other companies and trademarks and trade names in some instances.

1. O.R. table (Amsco model 2080)
2. Surgical spotlights (Amsco model LTM 72)
3. Anesthesia machine (North American Drager, model Narkomed 2A)
4. Cardioscope (Spacelabs model 514)
5. Pulse Oximeter & Capnography (Nellcor model N1000)
6. Dinamap Blood Pressure (Critikon model 1846SX)
7. Temperature Monitor (Mon-a-therm model 6500)
8. Oxygen Analyzer (North American Drager)
9. Oxygen Tanks
10. Nitrous Oxide Tanks
11. Resuscitation Cart
12. Blanket and Fluid Warmer (Amsco)
13. Autoclave (Amsco)
14. Gurneys
15. Rolling Surgical Instrument Table
16. VCR Monitor (MP Video)
17. TV Camera (MP Video)
18. Light Source (R. Wolfe model 5000.40)
19. Bovie (Valley Lab model SSE3B)
20. Bi-polar Bovie (Storz model 440E)
21. Tourniquet (Aspen Labs model ATS100)
22. Headlight (Cuda model 243000, light source-model M2-150)
23. ENT Operating Microscope (Zeiss model 310187, 250 mm lens)

Miscellaneous

Telephones

Two (2) wall type telephones and one (1) desk telephone are installed. Two telephones are near the rear of the van in the Operating Room, and one (1) telephone is in the Nurses' Work Station area in the front of the van. The telephone line terminates near the main power entry point.

Film Viewers

One (1) film viewer is located at the front Nurses' Work Station area and one (1) film viewer is located in the Operating Room.

Fire Extinguishers

Three (3) 2/2# non-magnetic fire extinguishers are installed. One (1) is located in the Operating Room, one (1) in the Entry Area and one (1) in the front area. (Any suitable fire suppression is an available option.)

Smoke Detectors

Three (3) smoke detectors are provided, one (1) in each area, the front, center and rear of the van.

Oxygen/Suction

On-board oxygen is provided by two (2) oxygen cylinders mounted in the belly compartment 45 with connections in the Treatment Areas. Suction is also provided by means of a suction pump located in the belly compartment 45 with connections and a collection jar in the Treatment Area.

Leveling System

Lever actuated hydraulic leveling system can be operated by one person. Accommodates pad elevation irregularities in any direction.

Patient Lift

Perpendicular hydraulic patient lift has 1500 lb. capacity. Wall mount and remote pendant control.

Trailer Graphics

Standard graphics are included in the trailer base.

The installation and surgery-readiness of all invasive surgery essentials in a mobile van provides a truly novel and heretofore unknown structure. It is a feature of this invention that all essential operational equipment that is qualified to meet the State hospital code requirements is tailored for mobile van installation. The mobile van may be moved as desired and the expandable sides and the centrally-located Or table and Or spotlights, coupled with anaesthesia and autoclave supply meets invasive surgery needs in a novel manner.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawing.

What is claimed is:

1. A mobile invasive surgery van capable of being transported on the roads and highways and equipped with essential equipment for invasive surgery to be performed within the van, said van comprising:
   a main body section that is capable of being towed, mounted on wheels for mobility by a separate power section;
   an expandable portion of said main body provided by telescoping side sections thereof which move outwardly from the main body portion in order to form an expanded invasive surgery room; and
   an operating table centrally located in said expandable section, said table being stowable so that the expandable section may be nested or expanded without removal of said surgery room operating table from said van.

2. A mobile invasive surgery van structure in accordance with claim 1 and further comprising:
   a section of said van's main body, separate and apart from the surgical room section thereof, serving as a pre and post-operational patient recovery area;
   said pre and post-operational recovery areas characterized by patient gurney stations together with an established nurses' station for patient preparation and post-operational care of patients scheduled for said surgery room of said mobile invasive surgery van.

3. A mobile invasive surgery van in accordance with claim 1 and further comprising:
   a surgical spotlight centrally located and installed in said expandible surgery room, with said spotlight being fixably mounted above the operating table in a manner that lets the expansion and nesting of the sides of said van forming the surgical operating room thereof, take place without disrupting or removing the surgical spotlights or said operating table.

4. A mobile invasive surgery van in accordance with claim 1 and further comprising, in said expanded surgical room section:
   an anesthesia machine and associated anesthesia monitors in a designated section of said surgery room, with said anesthesia machine being installed in said room for mobility with the rest of said mobile operating van.

5. A mobile van in accordance with claim 4 and further comprising in said surgery room, the improvement of:
   a crash resuscitation cart that is designated an area of said surgery room for storage and use in said mobile operating van.

6. A mobile van in accordance with claim 4 and further comprising in said surgery room, the improvement of:
   a surgical instrument table and means for rolling said table and securing same when not in use for surgery.

7. A mobile van in accordance with claim 4 and further comprising in said surgery room, the improvement of:
   an autoclave for sterilizing instruments to be used in said surgery room, said autoclave being connected to and operated by a power source that is autonomous with said van.

8. A mobile van in accordance with claim 4 and further comprising in said surgery room, the improvement of:
   surgical monitoring means for said patient powered by a power source that is fixably mounted in said van and moveable therewith.

9. A surgical van in accordance with claim 4 and further comprising in said surgery room, the improvement of:
   closeable divider that can isolate the operating room from the pre and post-operational areas, which divider is available for use by nurses and anesthesiologists during invasive surgery in said mobile surgery room.

10. A mobile van in accordance with claim 4 and further comprising in said pre and post-operational areas, the improvement of:
    a patient lift for admitting ambulant, wheelchair or gurneyed patients in/out of said van's interior from a curbside location for said van.

11. A mobile van in accordance with claim 4 and further comprising in said van and in proximity with said surgery room, the improvement of:
    a scrub and dressing area for a surgeon that is to do invasive surgery in said van, said scrub area including means for supplying and accepting clean and surgically-soiled linens.

12. A mobile invasive surgery van structure capable of being transported on the roads and highways and equipped with essential equipment for invasive surgery to be performed within the van, said van comprising:
    a main body portion being mounted on wheels for mobility by a detachable trailer section;
    an expandable section of said main body forming an expanded invasive surgery room;
    an operating table centrally located in said expandable section, said table being pivotable so that the expandable section may be nested or expanded without removal of said operating table: and another section of said van's main body, separate and apart from the surgery room thereof serving as a pre and post-operational patient recovery area.

13. An invasive surgery van in accordance with claim 12 and further comprising:
said pre and post-operational recovery areas characterized by designated and independent patient gurney stations together with a nursing station for patient preparation and post-operational care of van patients.

14. An invasive surgery van in accordance with claim 12 and further comprising:
a surgical spotlight centrally located and installed in said surgery room, said spotlight being fixably mounted above the operating table in a manner that lets the expansion and nesting of the sides of said van forming said operating room thereof, take place without disrupting or removing the surgical spotlights or said operating table.

15. An invasive surgery van in accordance with claim 12 and further comprising, in said expanded surgical room section, the improvement of:
an anesthesia machine and associated anesthesia monitors in a designated section of said surgery room, with said anesthesia machine being permanently installed in said room for mobility with the rest of said mobile operating van.

16. An invasive surgery van in accordance with claim 13 and further comprising in said surgery room, the improvement of:
a crash resuscitation cart that is designated for moveable use in said mobile operating van.

17. An invasive surgery van in accordance with claim 1 and further comprising:
oxygen supplies in said van and means to pipe the oxygen to the patient's pre and post operational areas.

18. An invasive surgery van in accordance with claim 17 and further comprising:
a suctional supply for each of said patient's gurney locations to aid in the pre and post-operational care of van patients.

19. A method of invasive surgery involving a mobile invasive surgery van structure capable of being transported on the roads and highways and equipped with essential equipment for invasive surgery to be performed within the van, said method comprising:
mobilizing a main body section of the van so that it is capable of being moved;
expanding laterally outwardly a section of said main body section to provide a surgical room section therein; and
positioning a surgeon-controllable operating table in said surgical room section.

20. A mobile operating room "OR" for invasive surgical procedures equipped with;
all of the operating requirements called for in a fixed hospital facility, comprising a mobile surgical van having a main body and a surgical room section provided in a laterally outwardly expandable section of the main body of the mobile surgical van.

21. A mobile operating room in accordance with claim 20 and further comprising;
pre and postop areas that are part of said van and separate from said surgical room section.

22. A mobile operating room in accordance with claim 21 and further comprising, in the surgical room section:

a sterile "OR" table,
OR spotlights,
anesthesia machine, and
other comprehensive patient monitoring/care means.

23. A mobile operating room in accordance with claim 20 and further comprising;
a nursing surveillance station;
an autoclave, dressing facility, as well as a complete set of surgical instruments, all self-contained in place in the mobile vehicle.

24. A mobile invasive surgery structure capable of being transported on the roads and highways and equipped with essential equipment for invasive surgery to be performed within said structure, comprising:
a main van mounted on wheels for mobility by a detachable trailer section; and
an expandable van section thereof moveable outwardly and away from the main van body in order to form an expanded centralized invasive surgery room in the van.

25. A mobile operating room in accordance with claim 24 and further comprising;
an operating table centrally located in said room.

26. A mobile operating room in accordance with claim 24 and further comprising:
a section of said van's main body, separate and apart from the surgical room thereof to serve as a pre and post-operational patient recovery area.

27. A mobile invasive surgery van structure in accordance with claim 25 and further comprising:
said pre and post-operational recovery areas characterized by designated and independent patient gurney stations.

28. A mobile invasive surgery van structure in accordance with claim 24 and further comprising in said pre and post-op areas:
an established nurses station for patient preparation and post-operational care of patients of said mobile surgical van.

29. A mobile surgical van in accordance with claim 23 and further comprising:
a surgical spotlight centrally located and installed in said expandible surgical room section.

30. A mobile surgical van in accordance with claim 26 and further comprising:
said spotlight being fixably mounted above the operating table in a manner that lets the expansion and nesting of sides of said van take place without disrupting or removing the surgical spotlights or said operating table.

31. A mobile surgical van in accordance with claim 24 and further comprising, in said expanded surgical room:
an anesthesia machine and anesthesia monitors.

32. A mobile surgical van in accordance with claim 28 and further comprising, in a designated section of said surgical room;
said anesthesia machine being permanently installed in said room for mobility with the rest of said mobile operating van.

33. A mobile invasive surgery van structure having a main body and capable of being transported on the roads and highways, said van comprising:
equipment essential for invasive surgery to be performed within the van located in a surgical room section provided in a laterally outwardly expandable section of said main body.

34. A mobile surgical van in accordance with claim 32 and further comprising, together with said expanded surgical room section:
 a main body section that is capable of being towed, said main body portion being mounted on wheels for mobility by a detachable trailer section.

35. A mobile surgical van in accordance with claim 32 and further comprising, together with said expanded surgical room section:
 an expandable section of said main body that provides telescoping side sections thereof to be moved outwardly and away from the main body portion.

* * * * *

UNITED STATES PATENT AND TRADEMARK OFFICE
CERTIFICATE OF CORRECTION

PATENT NO. : 4,915,435

DATED : April 10, 1990

INVENTOR(S) : Brian M. Levine

It is certified that error appears in the above-identified patent and that said Letters Patent is hereby corrected as shown below:

Column 6, line 15, after "half" should be a --.--.

Column 10, line 38, before "closeable" should be --a--.

Column 11, line 66, after "room" should be --("OR").

Signed and Sealed this

Second Day of July, 1991

*Attest:*

HARRY F. MANBECK, JR.

*Attesting Officer*   *Commissioner of Patents and Trademarks*

(12) EX PARTE REEXAMINATION CERTIFICATE (6940th)
United States Patent
Levine (10) Number: US 4,915,435 C1
(45) Certificate Issued: Jul. 21, 2009

(54) MOBILE OPERATING ROOM WITH PRE AND POST-OPERATIONAL AREAS

(75) Inventor: Brian M. Levine, Laguna Niguel, CA (US)

(73) Assignee: Tractus Medical, Inc., Santa Barbara, CA (US)

Reexamination Request:
No. 90/009,055, Apr. 15, 2008

Reexamination Certificate for:
Patent No.: 4,915,435
Issued: Apr. 10, 1990
Appl. No.: 07/333,634
Filed: Apr. 5, 1989

Certificate of Correction issued Jul. 2, 1991.

(51) Int. Cl.
*B60P 3/14* (2006.01)

(52) U.S. Cl. ................ 296/24.38; 29/428
(58) Field of Classification Search ........... 29/428; 296/24.38
See application file for complete search history.

(56) References Cited

U.S. PATENT DOCUMENTS

| | | |
|---|---|---|
| 2,225,319 A | 12/1940 | Rollo |
| 2,744,781 A | 5/1956 | Black |
| 2,965,412 A | 12/1960 | Henderson et al. |
| 3,116,085 A | 12/1963 | Uttley |
| 3,234,696 A | 2/1966 | Spencer |
| 3,258,019 A | 6/1966 | Bellas et al. |
| 4,181,347 A | 1/1980 | Clark |
| 4,270,791 A | 6/1981 | Tann |
| 4,295,679 A | 10/1981 | Artweger et al. |
| D263,995 S | 4/1982 | Steele |
| 4,358,133 A | 11/1982 | Stucky |
| 4,425,978 A | 1/1984 | Star |
| 4,458,864 A | 7/1984 | Colombo et al. |
| 4,603,518 A | 8/1986 | Fennes |
| RE32,262 E | 10/1986 | Stewart |
| 4,644,705 A | 2/1987 | Saccomani et al. |
| 4,689,924 A | 9/1987 | Jurgensen |
| 4,759,582 A | 7/1988 | Kutzner |
| 4,829,936 A | 5/1989 | Mollhagen |
| 4,890,879 A | 1/1990 | Hurlock |
| 4,955,661 A * | 9/1990 | Mattice ............... 296/171 |

FOREIGN PATENT DOCUMENTS

| | | |
|---|---|---|
| DE | 3711048 A1 | 10/1988 |
| FR | 2591163 | 6/1987 |

OTHER PUBLICATIONS

Calumet Coach's Mobile Field Hospital Brochure, circa mid 1980s.*

(Continued)

*Primary Examiner*—Matthew C. Graham (57) ABSTRACT

A mobile operating room is a transportable unit in which invasive surgical procedures can be performed. The mobile vehicle is a self contained, expandable van that includes all of the operating requirements called for in fixed hospital facilities. A mobile trailer which, when set up on leveling jacks and expanded, includes an operating room, surgery table, operating lights and all of the essential facilities for complete invasive surgical procedures including pre and postop areas.

The surgical operating room itself (OR) contains a sterilizing autoclave for surgical instruments, a surgeon controllable automatic operating table, OR table, OR spotlights, anesthesia machine, and all essential surgical equipment necessary for comprehensive patient care.

At the time of issuance and publication of this certificate, the patent remains subject to pending reexamination control No. 90/010,466 filed Mar. 30, 2009. The claim content of the patent may be subsequently revised if a reexamination certificate issues from the reexamination proceeding.

OTHER PUBLICATIONS

Netzer Sereni Mobile Medical Unit Brochure, 1986.*
Tamro Mobile Hospital Brochure, 1985.*
Diplomat Brand Towable Medical System, circa 1970.*
Antar Mobile Hospital Brochure, 1977.*
Mobile Lithotripsy Trailer Brochure, 1988.*
Mobile Emergency Trailers Brochure, circa early 1980s.*
El Burz Medical Surgical Clinic Brochure, Mar. 1977.*
Sales Proposal of Relocatable Hospital System, from Brunswick Corporation, Defense Division, to Philippine Ministry of Health, May 9, 1979.
Hospital Services Group—The Butterfly 3×1 "A" Sales Brochure, undated.
Sales Proposal of Surgical Mobile Unit Type GB 200 Structure from SITEC to Medical Coaches Inc., date stamped Aug. 17, 1981.
Sales Proposal of Mobile Field Hospital from InterMed to Medicoach, Mar. 15, 1984.
Heal on Wheels, ICHCA Journal, Jul. 1971.
Sales Proposal of Mobile Health Care Systems "Surgical/Emergency Systems" from Amtech Enterprises Corp. to Medical Coaches, Inc., Feb. 5, 1982.
Aluminum Body Corporation, Production Bulletin 5796–6–84, Model No. SP–8303–F–1, Electronic Monitoring Facility, undated.
Aluminum Body Corporation, Production Bulletin 5279–6–82, Model No. SP–8122–F–1, Test Facility, undated.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–18 and 30 is confirmed.

Claims 19–29 and 31–35 are cancelled.

* * * * *

(12) EX PARTE REEXAMINATION CERTIFICATE (9042nd)
United States Patent
Levine (10) Number: US 4,915,435 C2
(45) Certificate Issued: May 29, 2012

(54) MOBILE OPERATING ROOM WITH PRE AND POST-OPERATIONAL AREAS

(75) Inventor: Brian M. Levine, Laguna Niguel, CA (US)

(73) Assignee: Tractus Medical, Inc., Santa Barbara, CA (US)

Reexamination Request:
No. 90/010,466, Mar. 30, 2009

Reexamination Certificate for:
Patent No.: 4,915,435
Issued: Apr. 10, 1990
Appl. No.: 07/333,634
Filed: Apr. 5, 1989

Reexamination Certificate C1 4,915,435 issued Jul. 21, 2009

Certificate of Correction issued Jul. 2, 1991.

(51) Int. Cl.
*B60P 3/14* (2006.01)

(52) U.S. Cl. ........................ 296/24.38; 29/428
(58) Field of Classification Search ............... 296/29.38; 29/428

See application file for complete search history.

(56) References Cited

To view the complete listing of prior art documents cited during the proceeding for Reexamination Control Number 90/010,466, please refer to the USPTO's public Patent Application Information Retrieval (PAIR) system under the Display References tab.

*Primary Examiner* — Matthew C. Graham (57) ABSTRACT

A mobile operating room is a transportable unit in which invasive surgical procedures can be performed. The mobile vehicle is a self contained, expandable van that includes all of the operating requirements called for in fixed hospital facilities. A mobile trailer which, when set up on leveling jacks and expanded, includes an operating room, surgery table, operating lights and all of the essential facilities for complete invasive surgical procedures including pre and postop areas. The surgical operating room itself (OR) contains a sterilizing autoclave for surgical instruments, a surgeon controllable automatic operating table, OR table, OR spotlights, anesthesia machine, and all essential surgical equipment necessary for comprehensive patient care.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-18 and 30 is confirmed.

Claims 19-29 and 31-35 were previously cancelled.

* * * * *